US010437929B2

(12) United States Patent
He et al.

(10) Patent No.: US 10,437,929 B2
(45) Date of Patent: Oct. 8, 2019

(54) METHOD AND SYSTEM FOR PROCESSING AN INPUT QUERY USING A FORWARD AND A BACKWARD NEURAL NETWORK SPECIFIC TO UNIGRAMS

(71) Applicant: Maluuba Inc., Toronto (CA)

(72) Inventors: Jing He, Mississauga (CA); Jean Merheb-Harb, Montreal (CA); Zheng Ye, Wuhan (CN); Kaheer Suleman, Cambridge (CA)

(73) Assignee: MALUUBA INC., Toronto (CA)

( * ) Notice: Subject to any disclaimer, the term of this patent is extended or adjusted under 35 U.S.C. 154(b) by 2 days.

(21) Appl. No.: 15/476,262

(22) Filed: Mar. 31, 2017

(65) Prior Publication Data

US 2017/0286401 A1 Oct. 5, 2017

Related U.S. Application Data

(60) Provisional application No. 62/316,208, filed on Mar. 31, 2016.

(51) Int. Cl.
*G06Q 30/06* (2012.01)
*G10L 15/16* (2006.01)
(Continued)

(52) U.S. Cl.
CPC ...... *G06F 17/2785* (2013.01); *G06F 16/3344* (2019.01); *G06F 17/16* (2013.01);
(Continued)

(58) Field of Classification Search
CPC ............... G06Q 30/0613; G10L 15/16; G06F 17/30598; G06K 9/6297; G06N 3/0454
(Continued)

(56) References Cited

U.S. PATENT DOCUMENTS 5,600,753 A * 2/1997 Iso ................ G06K 9/6297
704/200
5,845,049 A * 12/1998 Wu ................ G16B 40/00
706/20
(Continued)

FOREIGN PATENT DOCUMENTS

| CN | 105184289 | 12/2015 |
| CN | 105279495 | 1/2016 |
| KR | 10-1590724 | 2/2016 |

OTHER PUBLICATIONS

International Search Report and Written Opinon for PCT/IB2017/000457, dated Aug. 9, 2017, 14 pages.
(Continued)

*Primary Examiner* — Farzad Kazeminezhad
(74) *Attorney, Agent, or Firm* — Merchant & Gould P.C.

(57) ABSTRACT

Disclosed embodiments include systems and methods relevant to improvements to natural language processing used to determine an intent and one or more associated parameters from 5 a given input string. In an example, an input string is received and first and second different n-grams are applied to the input string. Recurrent neural network models are then used to generate output data based in part on the first and second different n-grams. In particular embodiments a recurrent neural network in both forward and backward directions specific to unigrams is applied. Intent detection and semantic labeling are applied to the output of the recurrent neural network models.

15 Claims, 4 Drawing Sheets

(51) Int. Cl.
*G06K 9/62* (2006.01)
*G06N 3/04* (2006.01)
*G06F 17/27* (2006.01)
*G06F 16/33* (2019.01)
*G06F 17/16* (2006.01)
*G06N 3/08* (2006.01)
*G06N 5/02* (2006.01)
*G06N 7/00* (2006.01)
*G06N 20/10* (2019.01)

(52) U.S. Cl.
CPC ......... *G06N 3/0445* (2013.01); *G06N 3/0454* (2013.01); *G06N 3/08* (2013.01); *G06Q 30/0613* (2013.01); *G06K 9/6297* (2013.01); *G06N 5/022* (2013.01); *G06N 7/005* (2013.01); *G06N 20/10* (2019.01); *G10L 15/16* (2013.01)

(58) Field of Classification Search
USPC ....................................................... 704/200
See application file for complete search history.

(56) References Cited

U.S. PATENT DOCUMENTS

| | | | |
|---|---|---|---|
| 6,202,049 B1 | 3/2001 | Kibre et al. | |
| 8,548,951 B2 | 10/2013 | Solmer et al. | |
| 2005/0080614 A1 | 4/2005 | Bennett | |
| 2015/0074027 A1 | 3/2015 | Huang et al. | |
| 2015/0161107 A1 | 6/2015 | Tur et al. | |
| 2015/0286747 A1 | 10/2015 | Anastasakos et al. | |
| 2015/0332670 A1 | 11/2015 | Akbacak et al. | |
| 2015/0348551 A1 | 12/2015 | Gruber et al. | |
| 2016/0042419 A1* | 2/2016 | Singh | G06Q 30/0613 705/26.41 |
| 2017/0061294 A1* | 3/2017 | Weston | G06N 3/0454 |
| 2017/0092264 A1* | 3/2017 | Hakkani-Tur | G10L 15/16 |
| 2017/0193072 A1* | 7/2017 | Vase | G06F 17/30598 |

OTHER PUBLICATIONS

Mikolov et al., "Context dependent recurrent neural network language model," IEEE Workshop on Spoken Language Technology, Miami, FL, Dec. 2-5, 2012, pp. 234-239, DOI 10.1109/SLT.2012.6424228.

Mikolov et al., "Recurrent neural network based language model," Interspeech 2010: International Conference on Spoken Language Processing, Makuhari, Japan, Sep. 26-30, 2010, pp. 1045-1048.

* cited by examiner

METHOD AND SYSTEM FOR PROCESSING AN INPUT QUERY USING A FORWARD AND A BACKWARD NEURAL NETWORK SPECIFIC TO UNIGRAMS

CROSS-REFERENCE TO RELATED APPLICATION

This application claims the benefit of U.S. Provisional Patent Application No. 62/316,208, filed on Mar. 31, 2016, which is hereby incorporated by reference in its entirety for any and all purposes.

FIELD

The present specification relates to methods and systems for processing an input query, and more particularly to processing natural language queries.

BACKGROUND

Natural language processing (NLP) is a field of computer science, artificial intelligence, and linguistics concerned with the interactions between computers and human (natural) languages. As such, NLP is related to the area of human-computer interaction. Many challenges in NLP involve natural language understanding that would enable a computer to derive meaning from human or natural language input.

SUMMARY

In accordance with an aspect of the specification, there are provided methods and systems for processing an input query.

In an example, a method of processing an input query includes receiving the input query, wherein the input query comprises a plurality of words; storing the input query in a memory storage unit; assigning a first n-gram and a second n-gram to the plurality of words, wherein the first n-gram is different from the second n-gram; applying a first recurrent neural network model to the first n-gram to generate first output data; applying a second recurrent neural network model to the second n-gram to generate second output data; and applying intent detection and semantic labelling to the first output data and the second output data.

In another example, there is a non-transitory computer readable medium encoded with codes, the codes for directing a processor to: receive an input query, wherein the input query comprises a plurality of words; store the input query in a memory storage unit; assign a first n-gram and a second n-gram to the plurality of words, wherein the first n-gram is different from the second n-gram; apply a first recurrent neural network model to the first n-gram to generate first output data; apply a second recurrent neural network model to the second n-gram to generate second output data; and apply intent detection and semantic labelling to the first output data and the second output data.

In a further example, there is a method of processing an input query including: receiving the input query, wherein the input query comprises a plurality of words; storing the input query in a memory storage unit; assigning a first n-gram and a second n-gram to the plurality of words, wherein the first n-gram is different from the second n-gram; applying, in a first layer, a first recurrent neural network model to the first n-gram to generate first output data, and applying a second recurrent neural network model to the second n-gram to generate second output data; pooling the first output data and the second output data from the first layer to generate input data for a second layer; and applying, in a second layer, the recurrent neural network model to the input data to generate final output data.

This summary is provided to introduce a selection of representative concepts in a simplified form that are further described below in the Description. This Summary is not intended to identify key features or essential features of the claimed subject matter, nor is it intended to be used in any way that would limit the scope of the claimed subject matter.

Other aspects and advantages of the invention will become apparent from the following detailed description taken in conjunction with the accompanying drawings which illustrate, by way of example, the principles of the invention.

BRIEF DESCRIPTION OF THE DRAWINGS

Reference will now be made, by way of example only, to the accompanying drawings.

DETAILED DESCRIPTION OF THE EMBODIMENTS

Figure 1:
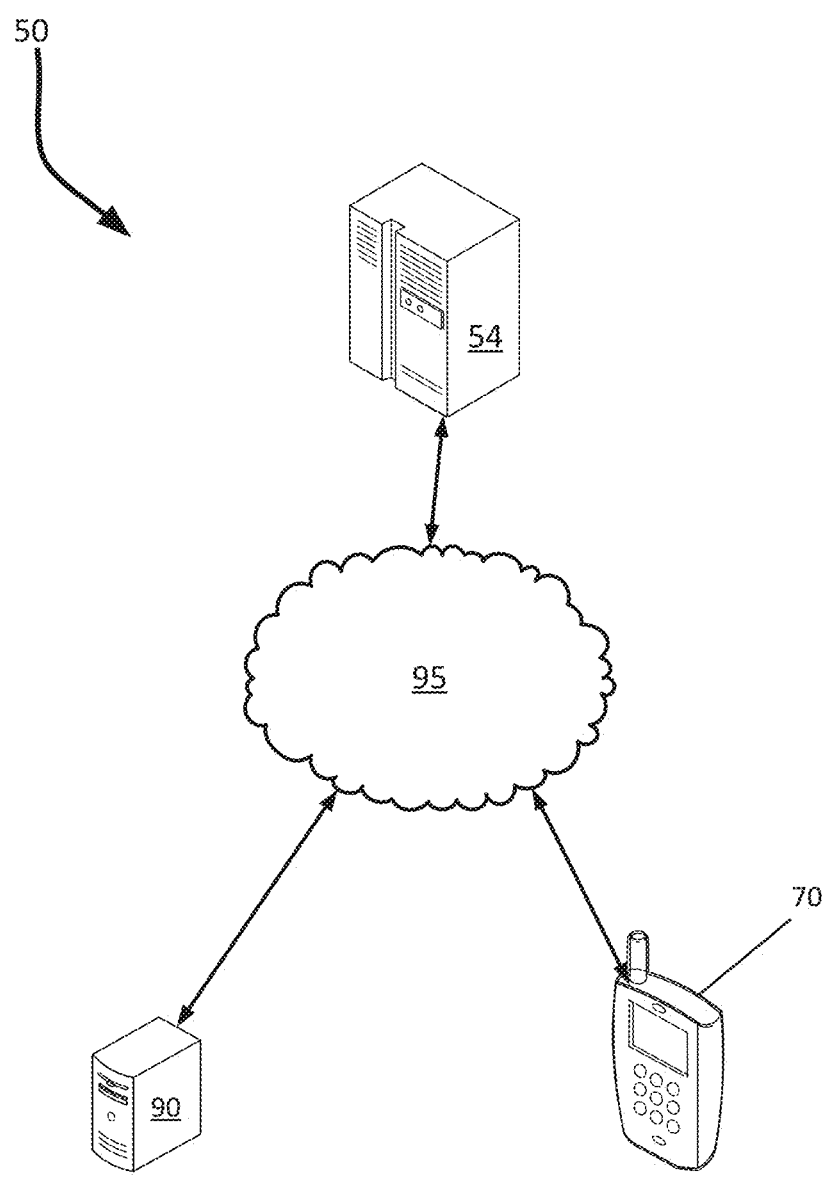
FIG. 1 illustrates a schematic representation of a computer network system.

Disclosed embodiments are relevant to improvements to natural language processing systems, which may be used to determine an intent and one or more associated parameters from a given input string. Some input, such as spoken language instructions, may have relatively small contexts, which can be challenging for some natural language processing systems (e.g., neural-network-based natural language processing systems) to process. Disclosed embodiments can be relevant to improving natural language processing, including the accuracy of intent and parameter detection for spoken language instructions.

Disclosed embodiments can also provide natural language processing in a resource-efficient manner, which can enable resource-constrained devices (e.g., embedded systems, such as vehicle head units) to provide natural language processing functionality. For example, disclosed embodiments can use recurrent neural networks and vector maps. This arrangement can provide robust natural language processing functionality with a small memory footprint and with little need for external resources. By contrast, traditional natural language processing systems can require large knowledge bases, ontologies, or external resources to perform processing, which can limit the kinds of devices on which the natural language processing can be used.

In an example, disclosed embodiments can receive input as a string. For instance, a user can ask a digital personal assistant to "Call John Smith", which can be converted to a string using a speech-to-text system. The input can be split into different representations, such as different n-grams (e.g., unigram, bigram, trigram), concept vector sequences, phoneme sequences, or other representations. For example the string can be broken into the unigrams "Call", "John", and "Smith"; the bigrams "Call_John" and "John_Smith"; and the trigram "Call_John_Smith".

Disclosed embodiments can use concept vectors to provide improved analysis on input with meanings that change dynamically. For example, words that make up movie titles can lack meaning or be misleading to a natural language processing system if the system does not understand that the words form a movie title. For instance, the words that make up "10 Cloverfield Lane" can have one meaning, but the phrase can have an entirely different one if the natural language processing system understands that the phrase refers to an address or the 2016 movie with that title. Disclosed embodiments can use a concept vector (e.g., a lexicon or list of words having a particular meaning) to help address these situations. For example, phrases that are movie titles, which may have ordinarily been marked as having an unknown representation, can be given a concept vector representation. A similar approach can be applied to items that are part of a person's contact list. For example, in many uses, the word "He" is a pronoun, but in other uses, "He" can be part of a person's name. If the name is in the user's contact list, then the natural language processing system may give the word "He" a concept vector representation in some circumstances.

Next, a pre-processing step can be applied to convert the sequences into a format usable by a recurrent neural network, such as a vector format. In an example, this can be performed using embeddings. (e.g., a map from strings to vectors). In an example, a background corpus (e.g., formatted as a map or dictionary) can be used. Where there is not a corresponding vector in a map or dictionary, an "unknown" tag or vector can be used.

The embeddings can be pretrained phrase embeddings. The phrases for the embeddings can be determined using a variety of techniques. In one technique, a shallow parser is run over the text and noun phrases are used as phrases. Another technique can involve gathering named entities or using items in a knowledge graph or ontology. Another technique is to use PMI (Pointwise Mutual Information) gathered from a corpus. In an example, where choosing to use "call_john" or "john_smith" as an n-gram, the representation with the higher PMI score can be chosen.

The embeddings can be initialized using various techniques, such as a skip-gram model (word2vec). See Mikolov, et al., Distributed Representations of Words and Phrases and their Compositionality, arXiv:1310.4546 [cs.CL] (Oct. 16, 2013), incorporated herein by reference for any and all purposes. Techniques can also include randomly initializing the embeddings or using Global Vectors for word representation (GloVe).

Continuing the example, the unigrams "Call", "John", and "Smith" may all be in an embedding and be converted into vectors. For the bigrams, there may be an embedding for "John Smith". In an example, "John Smith" may be found in a concept vector. There would likely not be an embedding for "Call John". In that case, the unigram "Call" may be used instead or it may be given a tag that indicates that it is unknown. Nor is it likely that an embedding exists for the trigram "Call John Smith". In that case the trigram could be given an unknown tag or its unigram values can be used.

The vectors are then used as input into their own specific recurrent neural networks. In an example, there can be a recurrent neural network specific to unigrams (e.g., trained on unigrams), another specific to bigrams, and so on. In some examples, there can also be recurrent neural networks specific to the direction of the sequence (e.g., forward or backward). In some examples, the outputs of the neural networks having different directions can be concatenated. For instance, the output of the forward bigram neural network can be concatenated with the output of the backward bigram neural network. Continuing the "Call John Smith" example, the output of "Smith" on the forward unigram recurrent neural network can be concatenated with the output of "Call" on the backward unigram recurrent neural. The resulting vector for "Call Smith" can then represent the entire sequence.

The output of the recurrent neural network can be, for each sequence or word of the sequence, a representation of the word based on the other parts of the sequence. For example, the output can represent, include, or be based on an understanding or approximation of what each input word of a sequence means within the context of the others. This allows the interpretation to be based on the entire context of the input. Using this output, it can be determined which representation (e.g., a bigram representation, trigram representation, concept vector representation) is most important or useful.

A pooling operation (e.g., max pooling) can be applied to the output of the neural networks to produce a single representation for each word. This can result in, for example, going from multiple different representations (e.g., unigram, bigram, trigram, and concept vector) to a single representation for each word. Optionally, this representation can be used as input to one or more neural networks or other machine learning processes.

Next, each word representation can be provided as input into a conditional random field and determine a most likely sequence (e.g., using the Viterbi algorithm or a variant thereof) to tag each word. This can include labeling each word using Inside-Outside-Beginning tags. For example, "Call" can be assigned an outside tag, "John" can be assigned a beginning tag, and "Smith" can be assigned an inside tag. This information can be used to determine an intent and associated parameters.

Given the text input of "Call John Smith", the output from the natural language processing system could be that the intent of the input is "Call" and the parameter is "Contact Name: John Smith". This output could be used by, for example, a vehicle head unit or device to carry out that result.

FIG. 1 illustrates a schematic representation of a computer network system 50. It is to be understood that the system 50 is purely exemplary and it will be apparent to those skilled in the art that a variety of computer network systems are contemplated. The system 50 includes a server 54, a client device 70, and an external service provider 90. The server 54, the client device 70, and the external service provider 90 are connected by a network 95. The network 95 is not particularly limited and can include any type of network such as the Internet, an intranet, a local area network, a mobile network, or a combination of any of these types of networks. In some embodiments, the network 95 can also include a peer-to-peer network.

In the present embodiment, the server 54 can be any type of computing device generally used to receive input, process the input and provide output. The server 54 is not particularly limited and can include a variety of different devices depending on the specific application of the server 54. For example, the server 54 can be optimized for its specific role in the system 50, such as for communicating with the client device 70 and the external service provider 90. Suitable devices the server 54 can include high performance blade server systems running UNIX operating systems, and having multiple processors. Alternatively, the server 54 can include devices such as a personal computer, a personal digital assistant, a tablet computing device, cellular phone, or laptop computer configured to carry out similar functions for systems not requiring a server with significant processing power. In other embodiments, the server 54 can also be implemented as a virtual server, a rented server session in the cloud, or any combination of the above.

The client device 70 can be any type of computing device used to communicate with the server 54 over the network 95 for generally handling input queries from a user. It is to be appreciated that, in general, the client device 70 includes programming instructions in the form of codes stored on a computer readable medium for performing the functions, such as in the form of a downloadable application. For example, the client device 70 can be any one of a personal computer, a laptop computer, a portable electronic device, a gaming device, a mobile computing device, a portable computing device, a tablet computing device, a personal digital assistant, a cell phone, a smart phone or the like. As an example, the client device 70 can be an embedded system, such as may be found in a vehicle's head unit, voice-activated devices (e.g., appliances). As a further example, the client device 70 can be a smart home system, a smart speaker system, or a wearable device. In the present embodiment, the client device 70 is configured to receive an input query from a user and to send an input query to the server 54 and to provide information in response to the input query. The input query is not particularly limited and can be any type of input query, such as a request for a service from the external service provider 90 or an instruction to control the client device 70 by executing functions with the client device 70. In addition, the format of the input query is not particularly limited. For example, the input query can be received as an audio input via a microphone or as a text string received via a keyboard-type input device. In another embodiment, the client device 70 need not send the input query to the server 54. Rather, some or all of the processing described as taking place on the server 54 can take place on the client device 70 without necessarily needing to connect to a network.

In the present embodiment, the external service provider 90 is generally configured to provide a service based upon the input query. It is to be appreciated by a person of skill in the art with the benefit of this description that the external service provider 90 can be any type of service provider, such as a search engine, an online store, a mapping service, a booking tool, and a home automation system. The manner by which the external service provider 90 operates is not particularly limited. For example, the external service provider 90 can be associated with a services that offer a database of general businesses, such as restaurants, hotels, theatres, etc. for which a user at the client device 70 may want to search, book, or obtain more information. As another example, the external service provider 90 can be a service provider that provides information such as weather, news, mapping information, or general knowledge. It is to be appreciated, with the benefit of this description, that although a single external service provider 90 is shown in FIG. 1, it is not necessarily limited to the external service provider 90. For example, in other embodiments, the system 50 can be modified to include a plurality of external service providers where each external service provider can provide different services and the exact external service provider to which the input query is directed can be dependent on the intent of the input query. In further embodiments, the external service provider 90 can be modified in internal service provider within the server 54, or can be omitted altogether when no external services are offered, such as for a system limited to processing input queries directed to the control of a local features of the client device 70.

It is to be re-emphasized that the system 50 described above is a non-limiting representation only. For example, although the network 95 of the present embodiment shown in FIG. 1 connects the server 54, the client device 70, and the external service provider 90, other embodiments can include separate networks for connecting the server 54 to the client device 70, and the server 54 to the external service provider 90.

Figure 2:
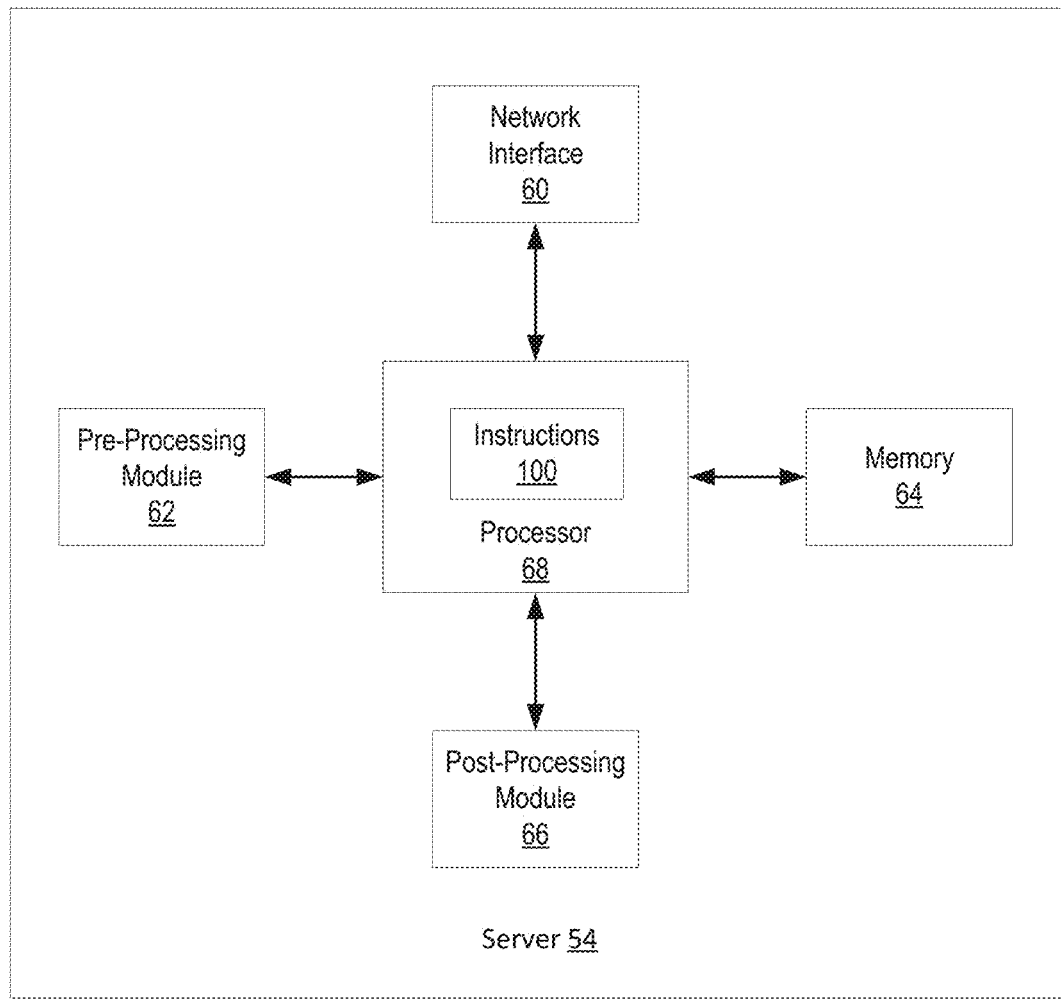
FIG. 2 illustrates a schematic block diagram showing various components of a server.

FIG. 2 illustrates a schematic block diagram showing various components of the server 54. It should be emphasized that the structure in FIG. 2 is purely exemplary and several different implementations and configurations are contemplated. As illustrated, the server 54 includes a network interface 60, a pre-processing module 62, and a memory storage unit 64, a post-processing module 66, and a processor 68.

The network interface 60 is not particularly limited and can include various network interface devices such as a network interface controller (NIC) capable of communicating with the client device 70 and the external service provider 90 across the network 95. In the present embodiment, the network interface 60 is generally configured to connect to the network 95 via a standard Ethernet connection.

The pre-processing module 62 is not particularly limited and can be any module capable of pre-processing the input query as discussed in greater detail below. For example, the pre-processing module 62 can be a separate processor within the server 54 configured solely for pre-processing input queries into n-grams. It is to be appreciated by a person of skill in the art with the benefit of this description that the pre-processing module 62 can be optional in some embodiments where the pre-processing is carried out by either the client device 70 or a separate external service (not shown). In other embodiments, the pre-processing module 62 can also be modified to be carried out using the processor 68.

The memory storage unit 64 can be of any type such as non-volatile memory (e.g. Electrically Erasable Programmable Read Only Memory (EEPROM), Flash Memory, hard disk, floppy disk, optical disk, solid state drive, or tape drive) or volatile memory (e.g. random access memory (RAM)). In the present embodiment, the memory storage unit 64 is generally configured to temporarily store input queries received from the client device 70 for processing as well as output for transmitting to the external service provider 90. In addition, the memory storage unit 64 is configured to store codes for directing the processor 68 for carrying out computer implemented methods. For example, the codes can include the programming instructions 100 further described below.

The post-processing module 66 is not particularly limited and can be any module capable of post-processing the output data generated from a process to determine an intent of the input query and to label portions of the input query. For example, the post-processing module can be a separate processor within the server 54 configured solely for post-processing output data. It is to be appreciated by a person of skill in the art with the benefit of this description that the post-processing module 62 can be optional in some embodiments where the post-processing is carried out by a separate external service, such as the external service provider 90. In other embodiments, the post-processing module 66 can also be modified to be carried out using the processor 68 or combined with the pre-processing module 62. In the present embodiment, the post-processing module 62 is configured to perform canonicalization and normalization (e.g. dates, times, categorizing words), merging of entities, or contact name and context lookup for connecting to the external service provider 90 for carrying out a specific task.

The processor 68 is not particularly limited and is generally configured to execute programming instructions 100 to process an input query. The manner by which the input query is processed is not particularly limited and will be discussed in greater detail below. For example, and to provide greater clarity to the understanding of the present embodiment, it can be assumed that the input query is "I want to buy x box 360 at best buy". It is to be appreciated that the input query can be the output of a voice recognition module based on audio input received at the client device 70. The programming instructions 100 would direct the processor 68 to process the input query to ultimately generate a single vector from which the intent of the input query can be identified. In addition, the single vector can also allow for semantic labeling where words and/or phrases in the input query are labelled and transmitted to the external service provider 90 for further processing.

Figure 3:
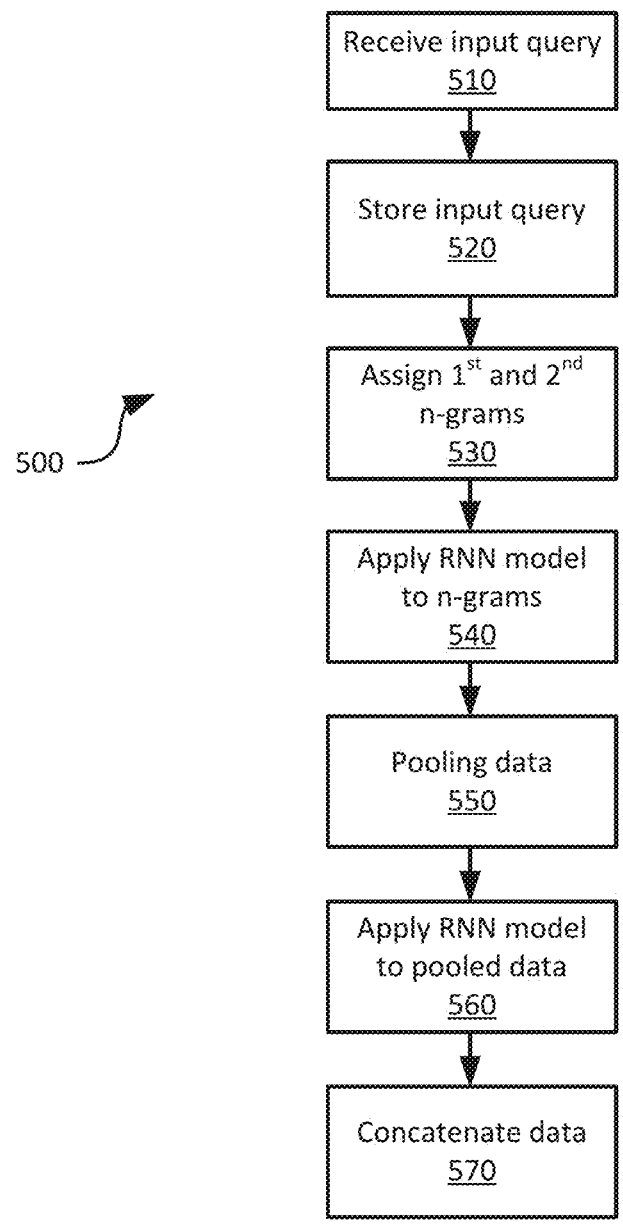
FIG. 3 illustrates a method of processing an input query carried out by the server represented in the form of a flow-chart

FIG. 3 illustrates a method 500 of processing an input query carried out by the server 54 represented in the form of a flow-chart. In order to assist in the explanation of the method 500, it will be assumed that the method 500 is performed using the system 50. Furthermore, the following discussion of the method 500 will lead to further understanding of the system 50 and its various components. In particular, it is to be understood that in one embodiment, the programming instructions 100 of the server 54 direct the processor 68 to carry out the methods discussed below. However, it is to be understood that the system 50 and/or the method 500 can be varied, and need not work exactly as discussed herein in conjunction with each other, and that such variations are within the scope of the present invention. Furthermore, it is to be emphasized, that method 500 need not be performed in the exact sequence as shown and that various blocks can be performed in parallel rather than in sequence; hence the elements of the method 500 are referred to herein as "blocks" rather than "steps".

Block 510 comprises receiving an input query having a plurality of words at the server 54 from the client device 70. In the present embodiment, the input query is received as a text string from the client device 70; however, it is to be appreciated, with the benefit of this specification, that the manner by which the input query is received is not particularly limited. For example, the input query can be received in other formats such as an audio file, an image file, a proprietary format, or in an encrypted format. Furthermore, the input query can also be received in a pre-processed format from the client device 70. For example, in other embodiments, one or more of the following blocks discussed in greater detail below can be carried out on the client device 70 prior to the server 54 receiving a pre-processed input query.

Block 520 comprises storing the input query received at block 510 in the memory storage unit 64. It is to be appreciated with the benefit of this description, that the input query is stored for easy retrieval for subsequent processing. For example, the server 54 can be configured to receive multiple input queries from the client device 70 and/or other devices via the network interface 60. The manner by which the input query is stored is not particularly limited. For example, the input query can be stored in a database for subsequent retrieval and/or as historical data. In particular, the input query can be stored with results and used as in subsequent queries that are similar to improve speed and performance of some systems. As another example, the input query can be stored in a queue along with additional input queries which are each processed in a predetermined order.

Block 530 comprises assigning a first n-gram and a different second n-gram to the plurality of words in the input query. In the present embodiment, the n-grams are assigned using the pre-processing module 62. The manner by which the plurality of words is divided into n-grams is not particularly limited. In the present embodiment, the pre-processing module 62 identifies all possible bigrams, trigrams, four-grams, five-grams, etc. based on information stored in a background corpus. The background corpus is also not particularly limited. For example, the background corpus in the present embodiment comprises a sample of a live query log, various training data set, and external providers. In the present embodiment, the first n-gram comprises only unigrams and the second n-gram comprises bigrams. It is to be appreciated with the benefit of this description that the second n-gram is assigned based on matching combinations of the plurality of words in the input query against known bigrams in the background corpus, leaving the remaining words as unigrams. In other embodiments, the n-grams can be assigned using other methods, such as assigning only bigrams to the plurality of words. In such an embodiment, words that are not in the background corpus are assigned as out of vocabulary words.

Continuing with the present example of the input query being "I want to buy x box 360 at best buy", the pre-processing module 62 would assign a first n-gram comprising individual words: I, want, to, buy, x, box, 360, at, best, buy. The pre-processing module 62 can also assign a second n-gram comprising bigrams, such as: I_want, want_to, to, buy, x_box, box_360, at, best_buy. It is to be appreciated with the benefit of this description that the words "want", "box", and "to" appear twice in the second n-gram that each word needs an associated bigram. The first want_to is for the word "want". The bigram candidates are taken from the words in the plurality of words that would form the bigram with the word. So for "to", the candidates are "to_buy" and "want_to". In the present embodiment, the candidate with the highest pointwise mutual information in the corpus is chosen. In other embodiments, other methods could be used such as scoring the bigrams using a language model. Furthermore, if "to_buy" was not in the background corpus then the only option is "want_to". In further embodiment, overlapping bigrams in the n-gram can be precluded such that "want_to" would not be a permitted bigram if "I_want" was an assigned bigram.

Although the present example is limited to two n-grams, it is to be appreciated by a person of skill in the art with the benefit of this description that the number of n-grams that can be assigned to the plurality of words of the input query is not limited. For example, a third n-gram can also be assigned to the plurality of words. The third n-gram can be another n-gram comprising different bigrams from the second n-gram discussed above, or the third n-gram can comprise trigrams, bigrams, and/or unigrams. Similarly, additional n-grams can be assigned to the plurality of words.

Block 540 comprises applying a recurrent neural network (RNN) model to the first n-gram and the second n-gram to generate separate output data in the first layer. In the present embodiment, the recurrent neural network model is applied independently to each of the n-grams to generate independent output data. However, it is to be appreciated that variations are contemplated. For example, the recurrent neural network model can be carried out in a forward direction to generate the output data. Alternatively, the recurrent neural network model can be carried out in a backward direction to generate the output data. In other embodiments, the recurrent neural network model can be carried out in both forward and backward directions for each n-gram to generate separate output data which is concatenated together to provide the output data for each of the n-grams. Carrying out the recurrent neural network model in the forward direction generates a vector representing the n-gram as output and carrying out the recurrent neural network model in the backward direction generates another vector. The vectors are concatenated together as output for block 550.

It is to be understood that the application of the recurrent neural network model to the n-grams is not particularly limited and that various combinations of recurrent neural network models can be used. For example, different recurrent neural network models can be used on different n-grams. The different recurrent neural network models can be trained on different types of n-grams. There can be a recurrent neural network model trained using unigrams, a recurrent neural network model trained using bigrams, a recurrent neural network model trained using trigrams, and so on. Further, there can also be recurrent neural network models trained using n-grams in particular directions, such as forward or backward. Where the recurrent neural network models are applied to the n-grams, the n-grams can be matched to respective models based on the n-gram type (e.g., a forward bigram-trained recurrent neural network can be applied to the bigrams in a forward direction).

As another example, in embodiments where three n-grams are assigned to the plurality of words, the first and second n-grams can use the same recurrent neural network model while the third n-gram can use the same recurrent neural network model or a concept vector recurrent neural network model. The concept vector in such embodiments is stored in an entity list based on retrofitting an embedding. The concept vector provides a mechanism to introduce curated information into the recurrent neural network in a manner that allows for global knowledge learned from a large corpus. The word vectors in the concept group are adjusted to be close while maintaining their original form from the word embedding training as much as possible. While embodiments are disclosed with reference to recurrent neural networks, other kinds of neural networks or machine learning techniques more broadly can be used. For example, convolutional neural networks can be used.

Block 550 comprises pooling the output data from the first layer to generate input data for a second layer. The manner by which output data is pooled is not particularly limited. In the present embodiment, the output data is max-pooled to provide input for the second layer. In other embodiments, the output from block 540 in the form of vectors can be concatenated. In further embodiments, a linear combination can also be carried out.

It is to be appreciated that in some embodiments, the output data from the application of the recurrent neural network model in the first layer can generate separate output data having different dimensions. Accordingly, a linear transformation can be applied to one or more of the output data to change the dimensionality to fit the recurrent neural network model for the subsequent second layer.

Block 560 comprises applying a recurrent neural network model to the pooled data generated from the execution of block 550 in a second layer to generate second layer output data. In the present embodiment, the second layer output data generated in block 560 is the final output data (i.e. the second layer is the final layer). However, it is to be appreciated that variations are contemplated. For example, the recurrent neural network model can have additional layers similar to the application of block 540 or block 560 to improve accuracy by allowing more complexity in the decision boundary. Accordingly, adding more layers can achieve improved discriminations. In addition, stacking layers has shown that it can form higher level representations that are better at generalizing data that has not been previously presented. However, it is to be appreciated by a person of skill in the art that adding layers increases the complexity cost and if there is not enough data, a risk of overfitting increases.

Block 570 comprises concatenating the output data from block 560 to generate a single vector. In the present embodiment, the single vector output includes an end state concatenation and an individual word level concatenation. The single vector can then be provided to an output layer of the recurrent neural network for intent detection and semantic labelling.

The manner by which intent detection is carried out is not particularly limited. In the present embodiment, the output layer carries out a softmax regression analysis on the single vector. In other embodiments, alternative classifiers such as a feed forward neural network, or a support-vector machine can be used.

The manner by which semantic labelling is carried out is not particularly limited. In the present embodiment, each word or phrase from the plurality of words is labelled with a semantic label. For example, the labels can be generated using conditional random field (CRF) analysis. It is to be appreciated with the benefit of this description that the accuracy of the conditional random field analysis can be improved by using the intent derived as discussed above. In other embodiments, alternative classifiers such as a feed forward neural network, or a support-vector machine can be used.

It is to be re-emphasized that the method 500 described above is a non-limiting representation only. For example, although the present embodiment discusses n-grams associated with words, it is to be appreciated by a person of skill in the art that variations are contemplated and that other types of n-grams can be processed using the method 500. For example, the n-grams can represent other forms of input such as phoneme transcriptions, character level, and concepts (e.g. gazetteers).

Figure 4:
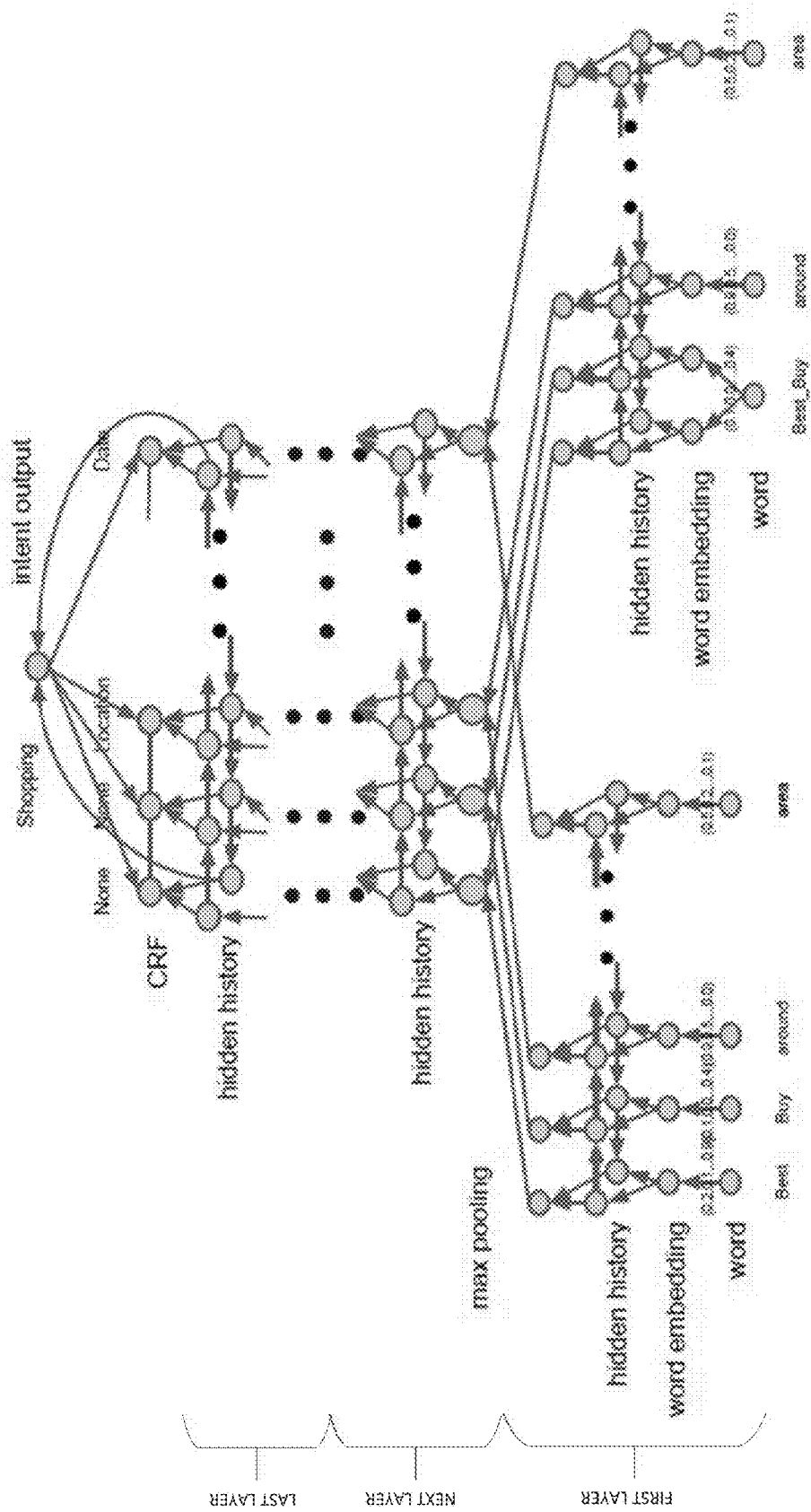
FIG. 4 illustrates an implementation of the method of FIG. 3.

FIG. 4 illustrates an implementation of the method 500. For this example, it can be assumed that the input query is "best buy around area". It is to be appreciated that the example shown is non-limiting and intended to be one example of carrying out the method 500. As shown, each of the n-grams goes to the recurrent neural network model independently for the first layer. Their outputs are then running through a max-pooling layer, and merging.

The first step of the natural language understanding model is running through a background corpus and returning a phrase embedding vector for each of n-grams. Phrases that are not included in the background corpus are annotated as unknown. Before the first layer, a linear transformation changes the dimensionality of each vector to fit the recurrent neural network model. It is to be appreciated with the benefit of this specification that in embodiments with multiple layers, a linear transformation can be carried out prior to each layer. Subsequently, each vector goes through linear transformation for the three recurrent neural network gates shown in FIG. 4, which are the inputs to the recurrent neural network model. Using the input $x$, $x_{f_t}$, $x_{g_t}$, and $x_{r_t}$ are obtained:

$$x_h = xW_h + b_h$$

$$x_z = xW_z + b_z$$

$$x_r = xW_r + b_r$$

The recurrent neural network model has two directions: forward and backward. The forward direction of the recurrent neural network takes one word at a time, starting from the beginning of the sentence. A gated recurrent unit is used in the recurrent neural network to prevent gradient vanishing problem. In a gated recurrent unit, the reset state is calculated using the current reset gate input and the hidden state from the previous word and activating it with sigmoid. At the first word, the previous hidden state is a vector of 0s.

$$r_t = \sigma(x_{r,t} + U_r h_{t-1})$$

Then, the candidate activation is calculated by performing an element wise multiplication of the reset state with the previous hidden state and added to the transformed current state gate input. Finally, the reset stat is activated with tan h.

$$\hat{h}_t = \tan h(x_{h,t} + U_h(r_t \odot h_{t-1}))$$

Finally, the update state is calculated which determines the output, and how much of the hidden state compared with the current state is kept. The update state is calculated using the update input gate and the transformed hidden state.

$$h_t = (1 - z_t)h_{t+1} + z_t \hat{h}_t$$

$$z_t = \sigma(x_{z,t} + U_z h_{t-1})$$

The backward recurrent neural network uses the same mechanism but goes through from the last word to the first word in the sentence.

After the first recurrent layer, the recurrent neural network model uses max-pooling on forward and backward outputs to combine the results from unigrams, bigrams and trigrams. The output of the forward and backward networks are then concatenated together to become an output of the n-gram for of the next layer of recurrent neural network or the output. In the final layer, the output of each word from the forward and backward recurrent neural network model are concatenated together in a single vector.

After the last recurrent layer, the user intent and semantic labels of this sentence will be provided using post-processing. For the intent detection, softmax is applied on the concatenation of the first words output in the backward network and the last words output in the forward network. For the semantic labeling, the softmax intent output to each words vector in the sentence is concatenated allowing it to use the information on the intent for classification. A linear transformation is performed changing the dimensionality to the number of possible semantic labels. Then, a conditional random field is used to perform the semantic labeling.

Using the Viterbi algorithm, instead of calculating the most likely class for every word individually, the most likely sequence for the entire sentence is calculated. In some examples, the outputs of the Viterbi algorithm can be limited based on the intent. For example, where the intent is "call", the output could be limited to "contact names" to limit potential erroneous outputs (e.g., having the output be "day of the week" when the intent is "call").

In the present embodiment, the conditional random field fills two tables using dynamic programming starting with the first word in the sequence. During the forward encoding, the likelihood of all sequences is calculated, then during the backward decoding, the most likely sequence is calculated. This step uses a transition matrix, which is a square matrix giving scores for the likelihood of a tag at time t−1 preceding a tag at time t.

At each of these steps, the second table is filled using the same equations but using argmax instead of max. These tables are $\alpha^{max}$ and $\alpha^{argmax}$. The following equations is used:

$$\alpha_1^{max}(Y_1) = \max_{y_1}(x_1(y_1) + Tr(y_1, y_2))$$

for each possible tag as $Y_2$. Then from word 2 to the second to last, the following equation is used:

$$\alpha_t^{max}(Y_{t+1}) = \max_{y_t}(x_t(y_t) + Tr(y_t, y_{t+1})) + \alpha_{t-1}^{max}(y_t)$$

Finally, at the last word, backward decoding is performed:

$$y_T = \mathrm{argmax}_{y_t}(x_T(y_T) + \alpha_{T-1}^{max}(y_T)).$$

Then from time T−1 to 1, the following equation is calculated:

$$y_i = \alpha^{argmax}[\mathrm{argmax}(yi+1)]$$

While specific embodiments have been described and illustrated, such embodiments should be considered illustrative only and should not serve to limit the accompanying claims.

What is claimed is:

1. A computer-implemented method of processing an input query, the method comprising:
    receiving the input query having a beginning and an end, wherein the input query comprises a plurality of words;
    storing the input query in a memory storage unit;
    forming unigrams from the plurality of words;
    forming bigrams from the plurality of words;
    pre-processing the unigrams and the bigrams using embeddings;
    applying a forward unigram recurrent neural network model to the pre-processed unigrams in a forward direction from the beginning to generate forward unigram output data;
    applying a backward unigram recurrent neural network model to the pre-processed unigrams in a backward direction from the end to generate backward unigram output data;
    concatenating the forward unigram output data and the backward unigram output data to form first output data;
    applying a second recurrent neural network model to the pre-processed bigrams to generate second output data;
    pooling the first output data and the second output data to form pooled output data; and
    applying intent detection and semantic labelling based on the pooled output data.

2. The method of claim 1, further comprising forming trigrams from the plurality of words.

3. The method of claim 2, further comprising applying a third recurrent neural network model to the trigrams to generate third output data, wherein the intent detection and semantic labelling are further based on the third output data.

4. The method of claim 2, further comprising applying a concept vector recurrent neural network model to the trigrams to generate third output data, wherein the intent detection and semantic labelling are further based on the third output data.

5. The method of claim 1, further comprising labelling each word from the plurality of words with a semantic label by applying conditional random field analysis.

6. The method of claim 5, wherein the conditional random field analysis uses intent for classification.

7. The method of claim 1, further comprising detecting an intent by applying a softmax regression analysis on the first output data and the second output data.

8. A non-transitory computer readable medium encoded with codes, the codes for directing a processor to:
receive an input query having a beginning and an end, wherein the input query comprises a plurality of words;
store the input query in a memory storage unit;
assign first n-grams and second n-grams to the plurality of words to form respective first n-gram data and second n-gram data, wherein the first n-grams are different from the second n-grams, and wherein the first n-grams are unigrams;
pre-process the first n-gram data and the second n-gram data using embeddings;
apply a forward recurrent neural network model to the pre-processed first n-gram data in a forward direction from the beginning to generate forward output data;
apply a backward recurrent neural network model to the pre-processed first n-gram data in a backward direction from the end to generate backward output data;
concatenate the forward output data and the backward output data to form first output data;
apply a third recurrent neural network model to the pre-processed second n-gram data to generate second output data;
pool the first output data and the second output data to form pooled output data;
and apply intent detection and semantic labelling based on the pooled output data.

9. The non-transitory computer readable medium of claim 8, wherein the second n-grams comprise bigrams.

10. The non-transitory computer readable medium of claim 8, wherein pooling the first output data and the second output data to form pooled output data includes max-pooling the first output data and the second output data to form the pooled output data.

11. The non-transitory computer readable medium of claim 10,
wherein the codes further direct the processor to provide the pooled first and second output data as input to a third neural network model; and
wherein applying intent detection and semantic labelling based on the pooled output data includes applying intent detection and semantic labeling to output of the third neural network model.

12. A computer-implemented method of processing an input query, the method comprising:
receiving the input query having a beginning and an end, wherein the input query comprises a plurality of words;
storing the input query in a memory storage unit;
assigning unigrams and bigrams to the plurality of words to form respective first unigram data and second bigram data;
pre-processing the first unigram data and the second bigram data using embeddings;
applying in a first layer:
a forward recurrent neural network model to the first unigram data in a forward direction from the beginning to generate forward output data;
a backward recurrent neural network model to the first unigram data in a backward direction from the end to generate backward output data; and
applying a second recurrent neural network model to the second bigram data to generate second output data;
concatenate the forward output data and the backward output data to form first output data;
pooling the first output data and the second output data from the first layer to generate input data for a second layer;
applying, in the second layer, a recurrent neural network model to the input data to generate final output data; and
applying intent detection and semantic labelling to the final output data.

13. The method of claim 12, wherein pooling the first output data and the second output data comprises applying a linear transformation on at least one of the first output data and the second output data.

14. The method of claim 13, wherein the linear transformation is configured to fit the second layer.

15. The method of claim 12, wherein the forward recurrent neural network model and the backward recurrent neural network model are trained for unigrams; and wherein the second recurrent neural network model is trained for bigrams.

* * * * *